(12) United States Patent
Vap

(10) Patent No.: US 11,945,062 B2
(45) Date of Patent: Apr. 2, 2024

(54) MACHINE AND METHOD OF MANUFACTURE FOR EIFS PANELS

(71) Applicant: MARVEL INTEGRATION, LLC, Littleton, CO (US)

(72) Inventor: Travis Everett Vap, Englewood, CO (US)

(73) Assignee: MARVEL INTEGRATION, LLC, Englewood, CO (US)

( * ) Notice: Subject to any disclaimer, the term of this patent is extended or adjusted under 35 U.S.C. 154(b) by 815 days.

(21) Appl. No.: 16/713,195

(22) Filed: Dec. 13, 2019

(65) Prior Publication Data

US 2020/0189011 A1 Jun. 18, 2020

Related U.S. Application Data

(60) Provisional application No. 62/780,013, filed on Dec. 14, 2018.

(51) Int. Cl.
*B23P 23/02* (2006.01)
*B23C 1/00* (2006.01)
(Continued)

(52) U.S. Cl.
CPC ............. *B23P 23/02* (2013.01); *B23C 1/002* (2013.01); *B23C 1/08* (2013.01); *B23C 3/12* (2013.01);
(Continued)

(58) Field of Classification Search
CPC . Y10T 409/307728; Y10T 409/308288; Y10T 29/5105; Y10T 29/5107;
(Continued)

(56) References Cited

U.S. PATENT DOCUMENTS 2,343,875 A * 3/1944 Schwartz ................. B23Q 5/10
310/90
3,824,891 A * 7/1974 Carroll ..................... B23Q 5/20
409/231
(Continued)

FOREIGN PATENT DOCUMENTS

CN 103213034 A * 7/2013
DE 102004022598 A1 * 12/2004
(Continued)

OTHER PUBLICATIONS

Machine Translation of KR 10-2013-0119292 A, which KR '292 was published Oct. 2013.*
(Continued)

*Primary Examiner* — Erica E Cadugan
(74) *Attorney, Agent, or Firm* — Holland & Hart LLP

(57) ABSTRACT

A levelling machine includes a pair of spaced apart rail assemblies, a gantry assembly and a face mill assembly. The spaced apart rail assemblies define an x axis. The gantry assembly is moveably attached to the pair of spaced apart rail assemblies whereby the gantry assembly defines a y axis. The gantry assembly is moveable in the x axis along the pair of spaced apart rail assemblies. The face mill assembly is moveably attached to the gantry assembly and is moveable in the y axis along the gantry assembly. The face mill assembly has a plurality of saw blades, the saw blades being generally in an x-y plane defined by the x axis and y axis. The saw blades have a plurality of teeth that extend downwardly generally in a z axis. The face mill assembly is moveable in the z axis.

7 Claims, 9 Drawing Sheets

(51) Int. Cl.
| | |
|---|---|
| *B23C 1/08* | (2006.01) |
| *B23C 3/12* | (2006.01) |
| *B23C 3/13* | (2006.01) |
| *B23Q 1/01* | (2006.01) |
| *B23Q 11/00* | (2006.01) |
| *B23Q 11/08* | (2006.01) |
| *B23Q 39/02* | (2006.01) |
| *B26F 3/12* | (2006.01) |

(52) U.S. Cl.
CPC ............... *B23C 3/13* (2013.01); *B23Q 1/012* (2013.01); *B23Q 11/0046* (2013.01); *B23Q 11/08* (2013.01); *B23Q 39/022* (2013.01); *B23C 2230/08* (2013.01); *Y10T 29/5107* (2015.01); *Y10T 409/30392* (2015.01); *Y10T 409/304088* (2015.01); *Y10T 409/304144* (2015.01); *Y10T 409/307168* (2015.01); *Y10T 409/308288* (2015.01)

(58) Field of Classification Search
CPC ............ Y10T 29/5176; Y10T 83/9292; Y10T 83/0414; Y10T 83/293; Y10T 408/36–385; Y10T 409/307168; Y10T 409/307784; Y10T 409/308344; Y10T 409/308568; Y10T 409/309352; Y10T 409/304088; Y10T 408/50; Y10T 409/30392; B23Q 1/012; B23Q 1/01; B23Q 1/015; B23Q 1/017; B23Q 39/00–39/048; B23Q 3/15786; B23Q 11/0046; B23Q 11/006; B23Q 11/08–11/0891; B23C 1/002; B23C 1/04; B23C 1/08; B23C 1/10; B23C 3/13; B23C 5/06; B23C 2230/08; B23B 39/006; B23B 2251/68; B23B 2270/30; B23B 2270/62; B24B 7/005; B24B 7/224; B24B 27/0023; B24B 55/06–55/12; B24B 55/04–55/057; B23P 23/00–23/04; B26F 3/12; B26F 3/06–3/10; B26D 1/547–5535; B26D 7/10; B27C 9/04
USPC ....... 409/202, 212, 192, 203, 213, 217, 231, 409/137, 134; 29/26 R–26 A, 56.5; 83/651.1, 16, 171; 408/31–53, 67; 144/35.1, 35.2
See application file for complete search history.

(56) References Cited

U.S. PATENT DOCUMENTS

| | | | | | |
|---|---|---|---|---|---|
| 5,524,328 | A | * | 6/1996 | Hardesty | B23Q 3/16 409/197 |
| 5,788,426 | A | * | 8/1998 | Daniels | B23C 5/006 407/53 |
| 6,428,453 | B1 | * | 8/2002 | Hoppe | B23Q 1/5406 409/203 |
| 6,604,894 | B1 | * | 8/2003 | Noggle | B23C 5/2295 407/43 |
| 6,626,617 | B2 | * | 9/2003 | Lorber | B23C 3/30 409/137 |
| 7,272,882 | B1 | * | 9/2007 | Onsrud | B27C 9/04 409/189 |
| 7,682,113 | B2 | * | 3/2010 | Liou | B23Q 1/012 409/212 |
| 2013/0336737 | A1 | * | 12/2013 | Fujita | B23C 3/00 408/87 |
| 2014/0161544 | A1 | * | 6/2014 | Morandeau, Sr. | B23C 3/13 407/34 |

FOREIGN PATENT DOCUMENTS

| | | | |
|---|---|---|---|
| DE | 102017219319 A1 | * | 5/2018 |
| JP | 2012-192464 A | * | 10/2012 |
| KR | 10-0864052 A | * | 10/2008 |
| KR | 10-2012-0090196 A | * | 8/2012 |
| KR | 10-2013-0119292 A | * | 10/2013 |
| KR | 10-1801202 B1 | * | 11/2017 |

OTHER PUBLICATIONS

Machine Translation of KR 10-0864052 A, which KR '052 was published Oct. 2008.*
Machine Translation of JP 2012-192464 A, which JP '464 was published Oct. 2012.*
Machine Translation of KR 10-1801202 B1, which KR '202 was published Nov. 2017.*
Machine Translation of CN 103213034 A, which CN '034 was published Jul. 2013.*

* cited by examiner

MACHINE AND METHOD OF MANUFACTURE FOR EIFS PANELS

FIELD OF THE DISCLOSURE

This disclosure relates to exterior insulated finish systems and in particular a machine to manufacture and a method of manufacture for at least a portion of the panels used in exterior insulated finish systems.

BACKGROUND

Exterior insulated finish systems (EIFS) were created after the second world war in order to cover up and rehabilitate buildings throughout Europe wherein the exteriors of buildings were damaged by bullets and the like. The technology was introduced to North America in the 1970s. A typical EIFS panel is made up of exterior gypsum board, fluid applied air and water barrier, covered with EPS (expanded polystyrene) insulation, which is then covered with a base coat and mesh, followed by an acrylic finish coat. The EPS layer is used for creating architectural detail, trims, shapes and reveal features demanded by architectural considerations.

Typically, an EIFS panel is built by a skilled labor force on site and the EPS layer is rasped by hand tools to make the exterior surface appear smooth. Reveals are placed with hot knife tools in accordance with the architecture requirements.

It would be advantageous to provide a machine for automating at least part of the manufacture of the EIFS panel. As well, it would be advantageous to provide a method of manufacture for at least part of the EIFS panel.

SUMMARY

The present disclosure relates to a levelling machine for use in association with panel having a plurality of layers including a top layer. The levelling machine includes a pair of spaced apart rail assemblies, a gantry assembly and a face mill assembly. The spaced apart rail assemblies define an x axis. The gantry assembly is moveably attached to the pair of spaced apart rail assemblies whereby the gantry assembly defines a y axis. The gantry assembly is moveable in the x axis along the pair of spaced apart rail assemblies. The face mill assembly is moveably attached to the gantry assembly and is moveable in the y axis along the gantry assembly. The face mill assembly has a plurality of saw blades, the saw blades being generally in an x-y plane defined by the x axis and y axis. The saw blades have a plurality of teeth that extend downwardly generally in a z axis. The face mill assembly is moveable in the z axis.

The face mill assembly may include a mill portion operably connected to a hood portion and a back support. The mill portion may include the plurality of saw blades. The back support may be moveably attached to the gantry assembly.

The plurality of saw blades may rotate in opposite directions.

The hood portion may be operably attached to a suction device.

The gantry assembly may include a gantry beam and a pair of gantry uprights attached at either end of the beam and extending downwardly therefrom. The pair of gantry uprights may be moveably connected to the pair of spaced apart rail assemblies.

The levelling machine may further including an edging assembly moveably attached to the gantry assembly. The edging assembly may be moveable in the y axis along the gantry assembly.

The edging assembly may include a drill bit extending downwardly in the z axis and may be moveable upwardly and downwardly.

The levelling machine may include a reveal assembly moveably attached to the gantry assembly and it may be moveable in they axis along the gantry assembly and the edging assembly.

The reveal assembly may include a hotwire cutter extending downwardly in the z axis and is moveable upwardly and downwardly.

The levelling machine may include an edging and reveal assembly including an edging assembly and a reveal assembly wherein the edging assembly and the reveal assembly are moveable independently in the z axis.

A method of machining a top layer of a panel having a predetermined plurality of layers including the steps of:
  positioning the panel;
  levelling the panel; and
  grinding the top layer of the panel.

The method may further include the step of edging the panel.

The method may further include the step of etching reveals into the panel.

Further features will be described or will become apparent in the course of the following detailed description.

BRIEF DESCRIPTION OF THE DRAWINGS

The embodiments will now be described by way of example only, with reference to the accompanying drawings, in which.

DETAILED DESCRIPTION

Figure 1:
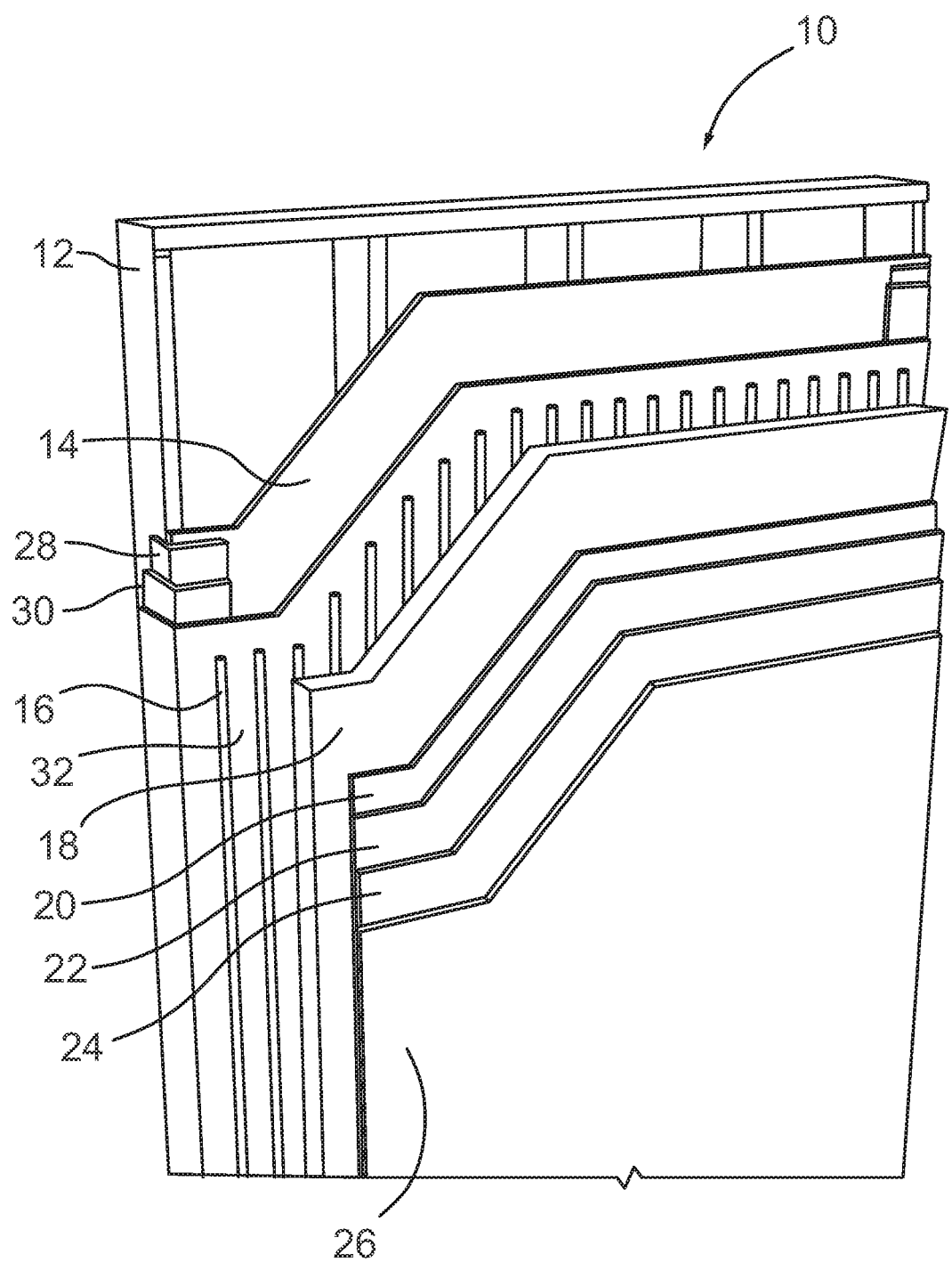
FIG. 1 is a partially broken away perspective view of an exterior insulated finish system panel.

A typical EIFS includes a plurality of EIFS panels each made up of exterior gypsum board, fluid applied air and water barrier, covered with EPS insulation, which is then covered with a base coat and mesh, followed by an acrylic finish coat. The EPS layer is used for creating architectural detail, trims, shapes and reveal features demanded by architectural considerations. More specifically referring to FIG. 1 an EIFS panel is shown generally at 10. The EIFS panel shown herein is by way of example only. The EIFS panel 10 may include a steel frame 12, gypsum board 14, waterproof air and water barrier 16, expanded polystyrene insulation (EPS) layer 18, mesh 20, base coat 22, primer 24 and finishing coat 26. The panel 10 may also include point portions 28 and 30. Typically adhesive 32 is used to secure the EPS layer 18 to the waterproof air and water barrier 16. It will be appreciated by those skilled in the art that the specific layers may vary depending on the requirements of the relevant Building Codes and the architectural requirements.

More recently to improve efficiencies EIFS panels have been prefabricated off site. However, because hand-rasping is a method that entails the use of a hand level, measurements and a great deal of human judgement to be done correctly, there can be a great deal of variation in the flatness and location of the EPS surface relative to the steel frame. Thereafter when erecting a plurality of EIFS panels, because each panel may have varied thicknesses, it is difficult to align the exterior of the panels so that the wall system is consistently flat from panel to panel. To properly align panels that have a varied thickness, a contractor must do so from both the inside and the outside of the building which adds to the cost and introduces safety concerns. Accordingly, it would be desirable to have a machine and method that could accurately level the EPS relative to the steel frame and provide reveals in a precise manner and more efficiently.

Figure 2:
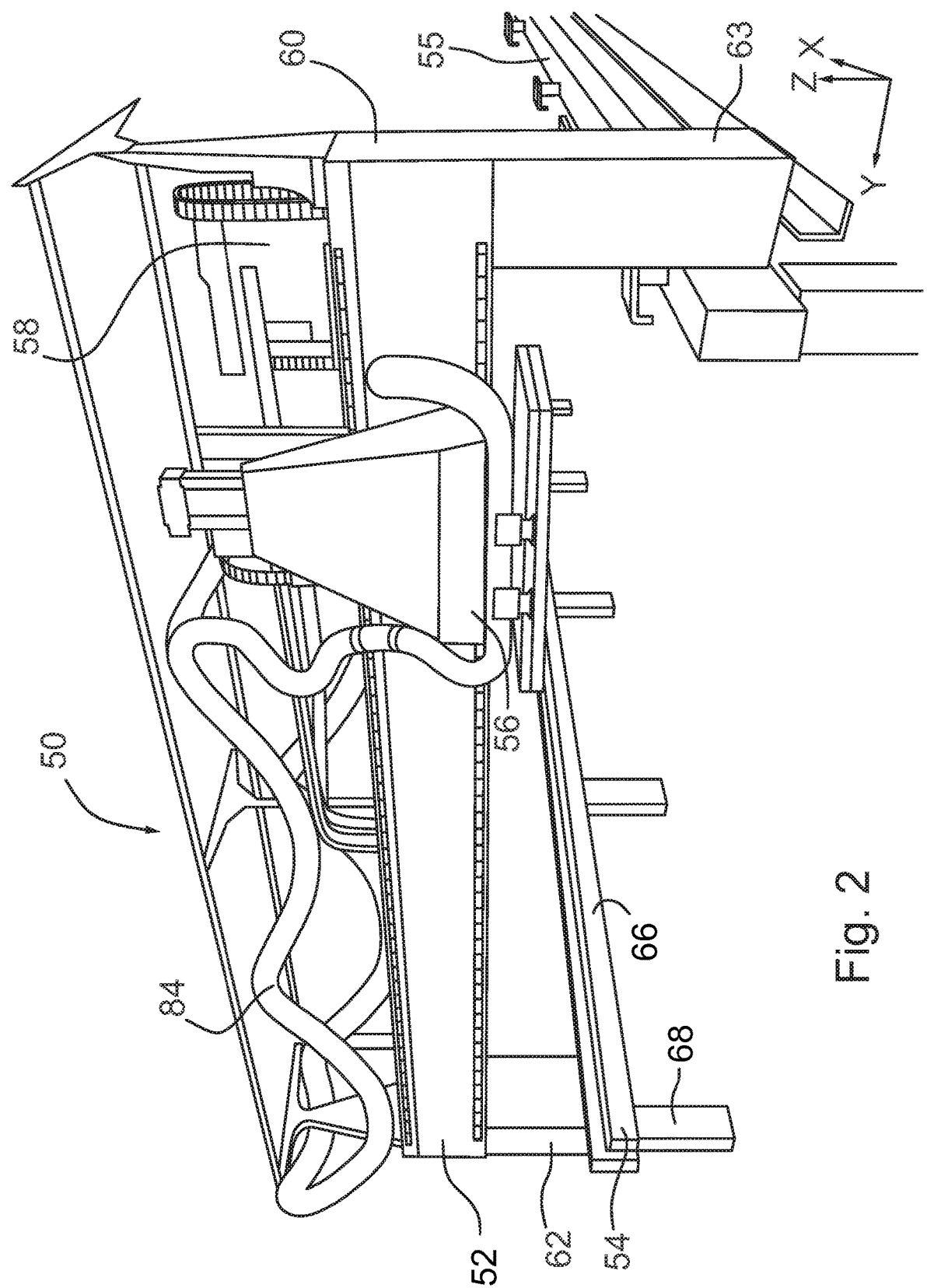
FIG. 2 is perspective view of a levelling machine used in one step of process for manufacturing the exterior insulated finish system panel of FIG. 1.

Referring to FIG. 2 an EPS levelling machine is shown generally at 50. The levelling machine 50 includes a gantry assembly 52, a pair of spaced apart rail assemblies 54 and 55, a face mill assembly 56, an edging and reveal assembly 58 (best seen in FIG. 7). By way of reference the rail assemblies 54 and 55 define an x-axis and the gantry assembly defines a y-axis. A z-axis is perpendicular to an x-y plane defined by the x and y axes.

The gantry assembly 52 is moveably attached to the rail assemblies 54 and 55 such that the gantry assembly is moveable along the x-axis. The face mill assembly 56 is moveably attached to the gantry assembly such that it is moveable along the y axis. Similarly, the edging and reveal assembly 58 is moveably attached to the gantry assembly 52 such that it is moveable along the y-axis.

The gantry assembly 52 includes a gantry beam 60 and pair of gantry uprights 62 and 63 attached to either end of the gantry beam 60. The pair of gantry uprights 62 and 63 are moveably attached to rail assemblies 54 and 55. Rail assembly 55 includes a chain link 64 (best seen in FIG. 3) which is attached to the respective gantry upright 63 and the chain link is used to move the gantry assembly 52 along the rail assemblies 54 and 55.

The rail assemblies 54 and 55 include a rail portion 66 for receiving the gantry uprights 62 and 63. A plurality of spaced apart legs 68 extend downwardly from the rail portion. Rail assembly 55 further includes a chain link 64 operably attached to the gantry assembly 52 for moving the gantry assembly along the rail assemblies 54 and 55.

Figure 3:
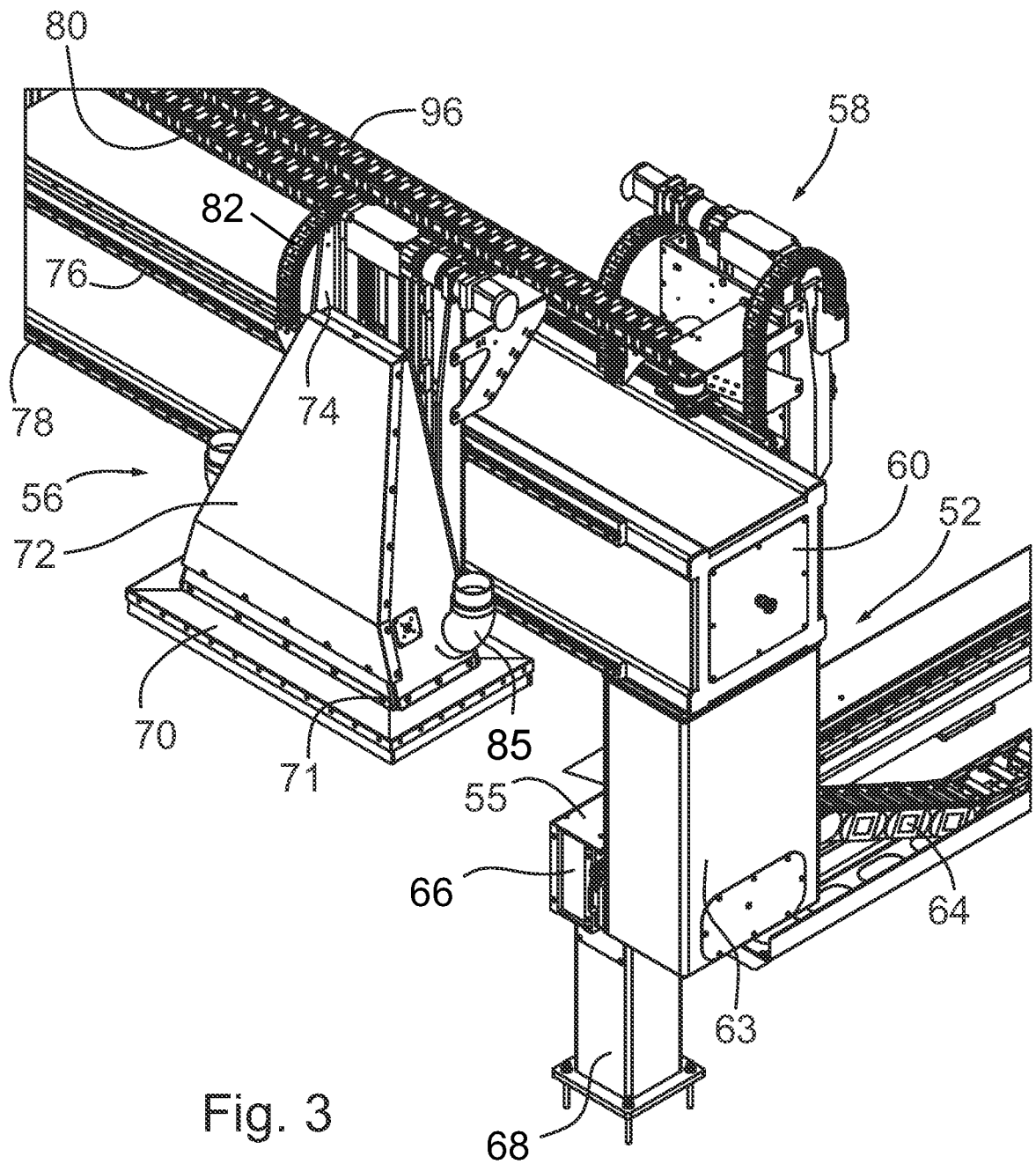
FIG. 3 is an enlarged view of the face mill assembly of the levelling machine shown in FIG. 2.
Figure 4:
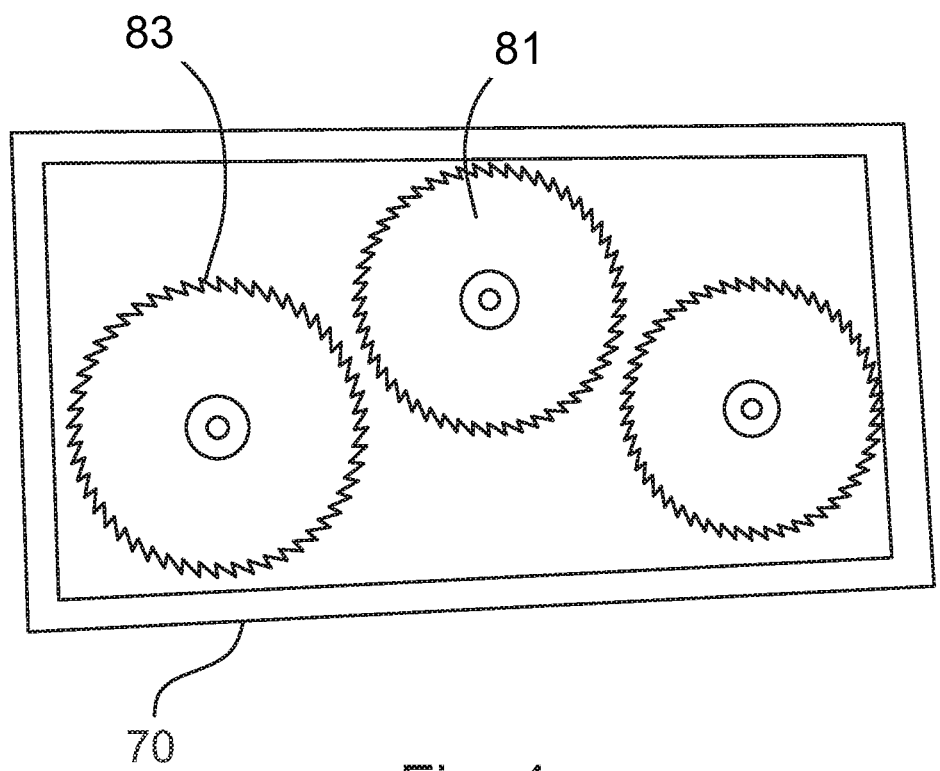
FIG. 4 is an enlarged perspective view of the underside of the face mill assembly of FIG. 3.
Figure 5:
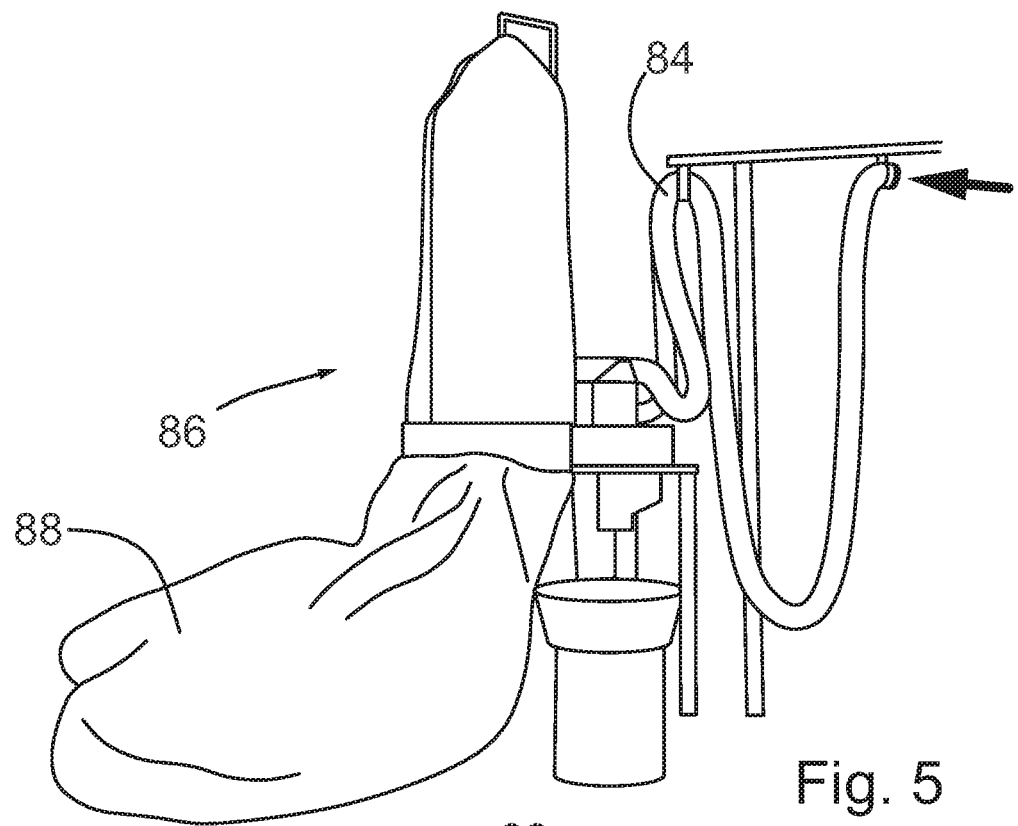
FIG. 5 is a perspective view of a suction device which is attachable to the levelling machine of FIG. 2.
Figure 6:
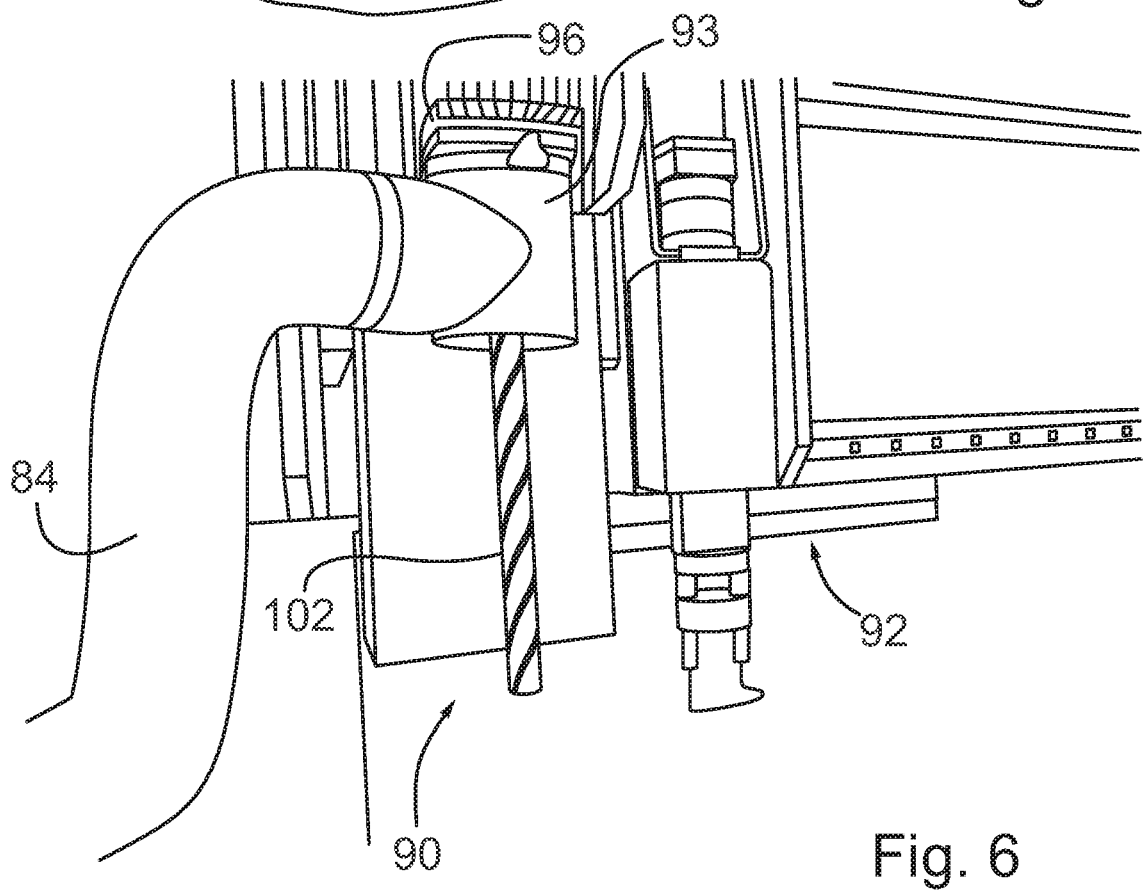
FIG. 6 is an enlarged perspective view of a portion of the edging assembly and reveal assembly of the levelling machine of FIG. 2.

As best seen in FIG. 3, the face mill assembly 56 includes a mill portion 70, a hood portion 72 and a back support 74. A pair of upper and lower face mill rails 76 and 78 respectively are mounted on the gantry beam 60. The back support 74 is moveably attached to the upper and lower face mill rails 76, 78 attached to the gantry assembly 52. A face mill chain link 80 is operably attached to the back support 74 and is used to move the face mill assembly 56 along the gantry assembly 52 in the y axis. The mill and hood assembly 71 includes the mill portion 70 and the hood portion 72. The mill and hood assembly 71 are moveably attached to the back support 74. A mill chain link 82 is operably attached between the back support 74 and the mill and hood assembly 71 and moves the mill and hood assembly 71 upwardly and downwardly thus moving the mill and hood assembly 71 in the z axis. The hood portion 72 includes a plurality of saw blades 81 as seen in FIG. 4. The saw blades 81 are generally in the x-y plane. The saw blades 81 have a plurality of teeth 83 that extend downwardly perpendicular to the hood portion or downwardly in the z axis. In use the saw blades 81 rotate in different directions. The saw blades are used to grind down or rasp the EPS layer of the EIFS panel. The hood portion 72 is part of an exhaust system that vacuums the rasped debris. The hood portion 72 has exit ports 85 which are attachable to hoses (shown in FIG. 2). The hoses are attached to a suction device 86 shown in FIG. 5. Suction device 86 includes removable and replaceable bags 88.

Referring to FIGS. 6 to 9, the edging and reveal assembly 58 includes an edging assembly 90 and a reveal assembly 92. The edging assembly 90 is used to square the edges of the panel or to square the edges of holes in the panel such as window or door openings in the panel. The reveal assembly 92 is used to create different patterns into the panel. For example, a company name or logo might be etched into the panel. Alternatively, a pattern may be etched into the surface of the entire panel to provide texture or other visual interest in the panel. It will be appreciated by those skilled in the art that, in the embodiment shown herein, the edging assembly and the reveal assembly are combined in an edging and reveal assembly 58. However, it will be appreciated by those skilled in the art that the edging assembly and the reveal assembly could be separate and could separately by attached to the gantry assembly 52 and could move independently in the x, y and z axes.

Figure 7:
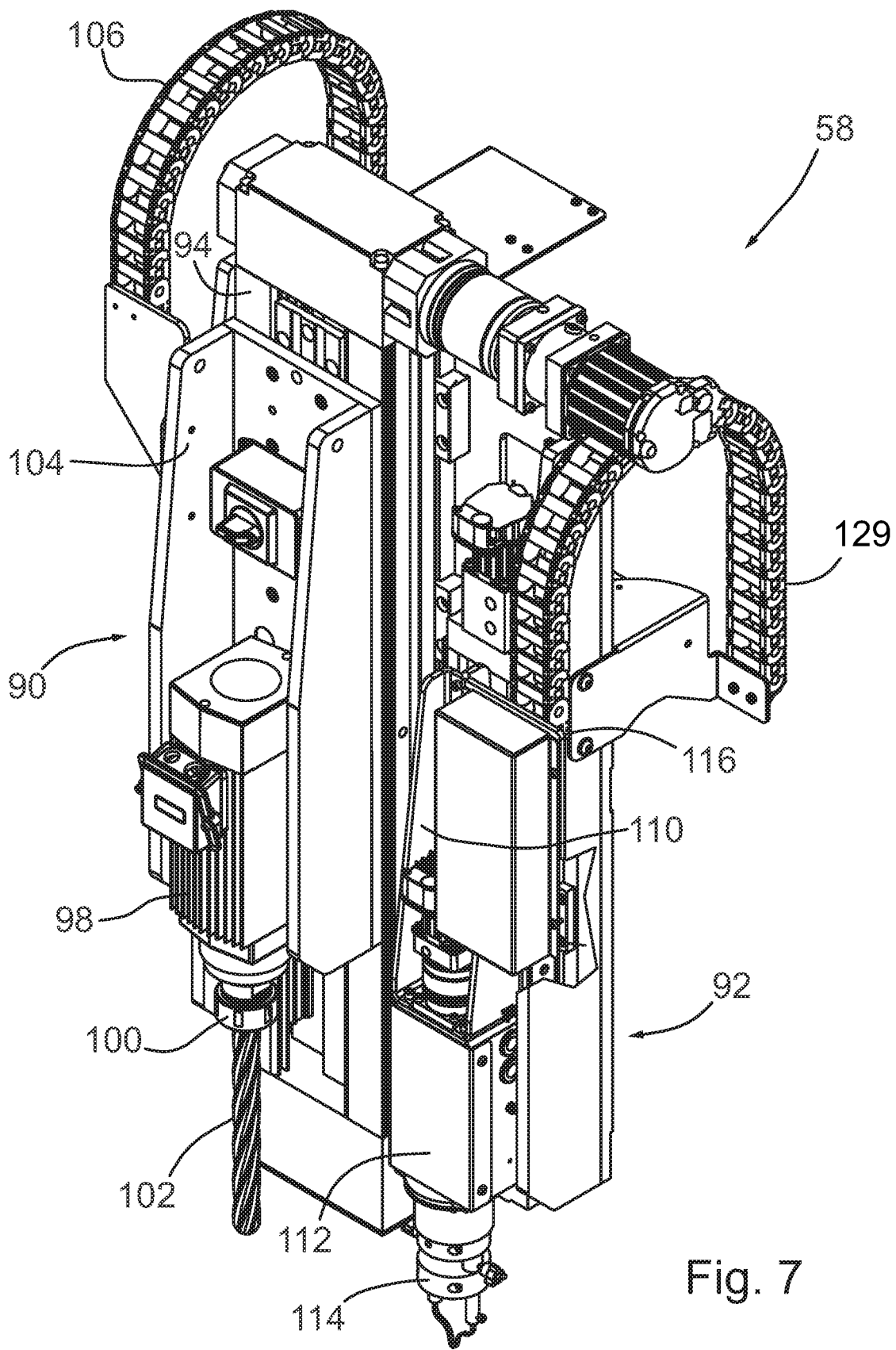
FIG. 7 is an enlarged perspective view of the edging assembly and reveal assembly of the levelling machine of FIG. 2.

Referring to FIG. 7, the edging and reveal assembly 58 includes a support frame 94 which is moveably attachable to the gantry assembly 52 in a fashion similar to that described above with regard to the face mill assembly 56. An edging and reveal chain link 96 (shown in FIG. 3) is operably attached to the support frame 94 and is used to move the edging and reveal assembly along the gantry assembly 52 in the y axis.

Edging assembly 90 includes a driver portion 98, a chuck 100 operably attached to the driver portion and a drill bit 102 inserted in the chuck. The drill bit 102 extends downwardly in the z axis. The driver portion 98 is operably attached to a back plate 104 which is moveably attached to the drill support frame 94. An edging chain link 106 is operably connected to the back plate 104 and the drill support frame 94 is configured to move the edging assembly 90 upwardly and downwardly in the z axis. The chuck 100 may also be attached to a hose 84 which in turn is attached to the suction device 86. Preferably the drill bit 102 is a gold drill bit.

Figure 8:
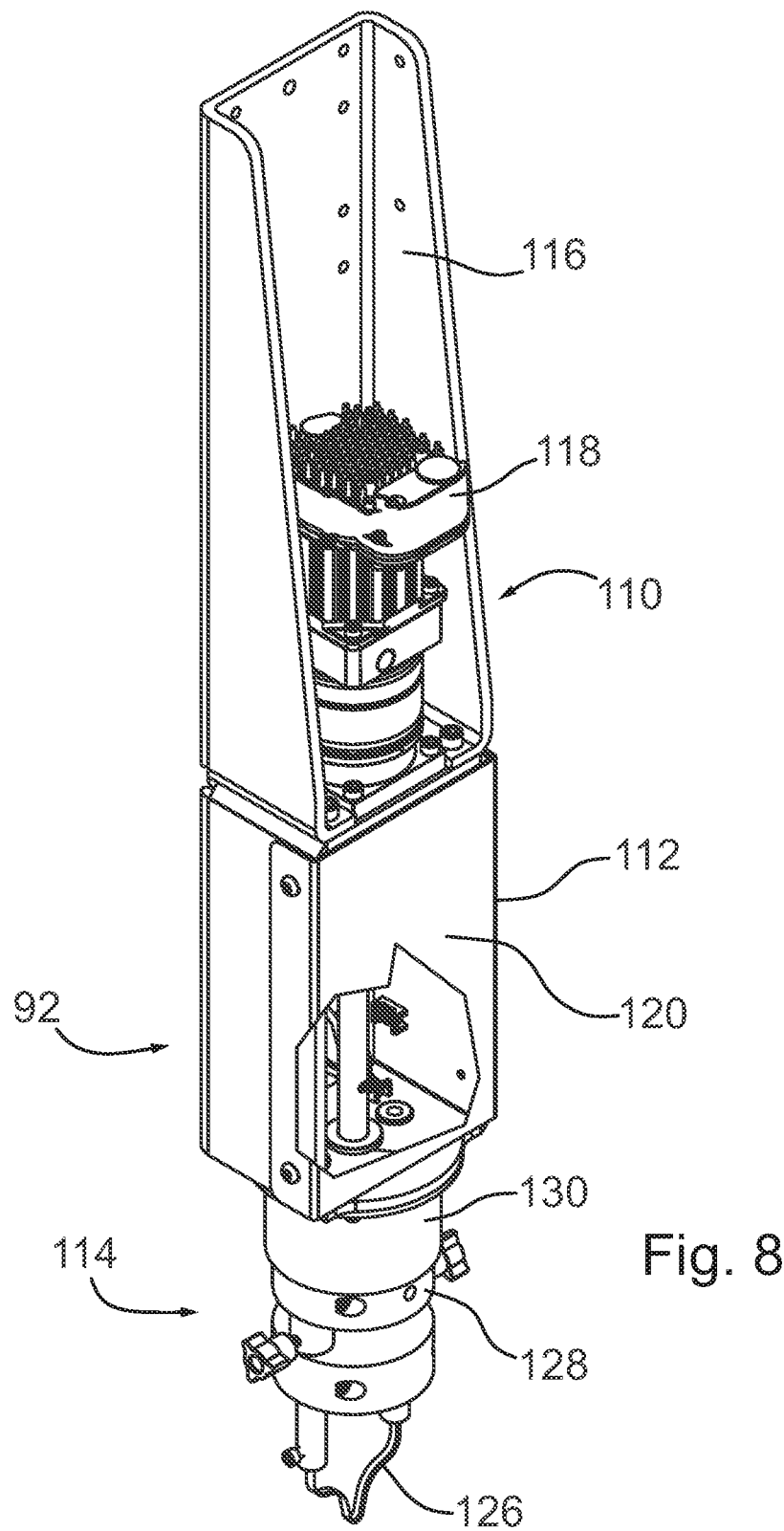
FIG. 8 is an enlarged perspective view of the reveal assembly of FIG. 7 with a portion broken away.
Figure 9:
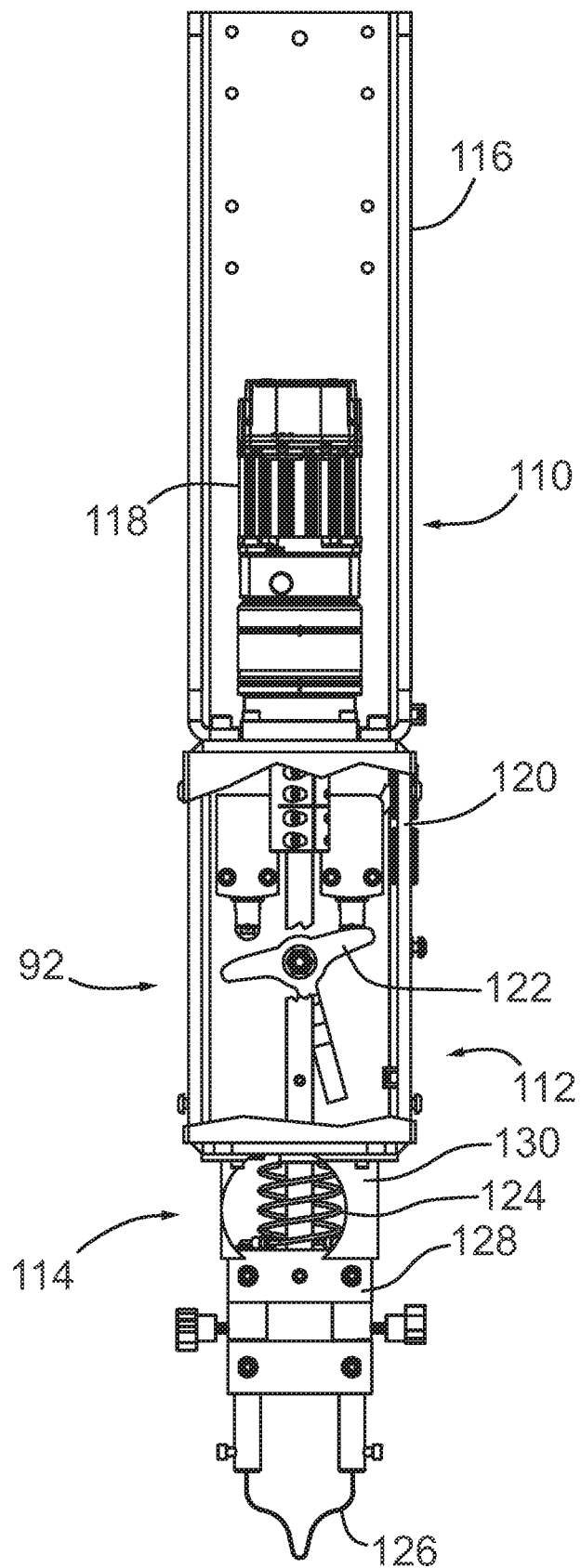
FIG. 9 is an enlarged front view of the reveal assembly of FIGS. 7 and 8 with a portion broken away.

The reveal assembly 92 includes a reveal motor assembly 110 operably connected to a control assembly 112 which is operably connected to a shape wire assembly 114. Referring specifically to FIGS. 7 to 9, the reveal motor assembly includes a reveal motor bracket 116 and a reveal motor assembly 118. The control assembly 112 includes a casing 120 and a limit switch assembly 122 (best seen in FIG. 9). Shape wire assembly 114 includes a wire loop 124 operably connected to the limit switch assembly 122. The wire loop 124 is operably connected to hotwire cutter 126 through and insulator block 128. A shield 130 covers the wire loop 124. Preferably the hotwire cutter 126 is a 350 degree F.° hotwire.

In the embodiment shown herein the hotwire cutter 126 has a general nib shape. It will be appreciated by those skilled in the art that different shape cutters could also be used. A reveal chain link 129 is operably connected to the back plate 104 and the reveal motor bracket 116 is configured to move the reveal assembly 92 upwardly and downwardly in the z axis.

The levelling machine is operably connected to a control system (not shown). The control system is typically computer operated. The control system moves the face mill assembly 56 in the x, z and z axes. Similarly, the control system moves the edging and reveal assembly 58 in the x and y axes and selectively move the edging assembly 90 and reveal assembly 92 in the z axis.

Figure 10:
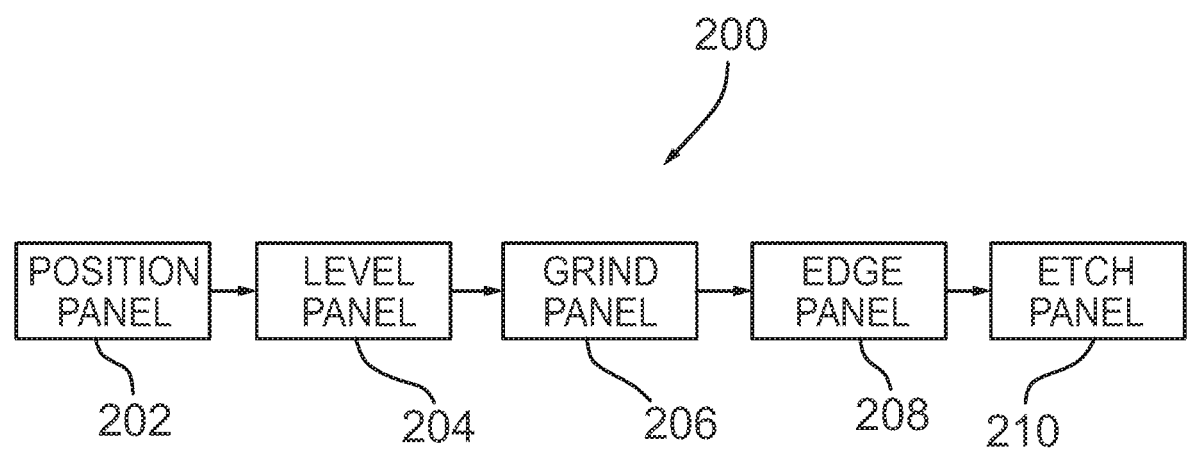
FIG. 10 is a flow chart of the method of machining an EPS layer of the EIFS panel shown in FIG. 1

In use the levelling machine is used to level the EPS layer 18 of the EIFS panel 10 shown in FIG. 1. A method of machining the EPS layer is described herein and shown generally at 200 in FIG. 10. First a panel is positioned in a predetermined location 202. The panel typically includes a predetermined plurality of layers with the top layer being a layer that is intended to be ground down to a predetermined depth. In the embodiment shown herein the top layer is an EPS layer and the other predetermine layers are steel frame, a gypsum board and a waterproof air and water barrier. The panel is then leveled 204. Thereafter the top layer is ground 206 to a predetermined depth. Then the edges are cut into the panel 208. The edges may be around the perimeter. The edges may also define cut outs such as window openings or door openings. Then reveals may be etched into the panel 210. It will be appreciated by those skilled in the art that the etching step and the edging step may be done in any order.

The levelling machine shown herein provides a method to accurately level the exterior surface and place reveals in a layer of EPS preferably within 1/16-1/32", wherein the EPS is ready to receive the base coat/mesh and fish coats. This levelling machine provides a means to ensure that each panel has a flat surface that can be easily matched with adjacent panels within a wall system. This method of providing accurately located exterior EPS surface enables one to align the exterior of the panels from the inside of the building. The latter is because the exterior surface is accurate relative to the steel frame, the contractor can set panels by referencing the back side of the panel system as the contractor can rely on where the exterior surface is located by virtue of this levelling machine. More specifically, during constructions the installers are able to install the panels with reference to interior layout line, then spot check the exterior visually and make minor adjustments to align the panels and finalize the installation. Because of the tight tolerance realized by the levelling machine and method described herein the installation is safer, faster, accurate, visually appealing, and more cost effective.

Generally speaking, the systems described herein are directed to a levelling machine. Various embodiments and aspects of the disclosure are described in the detailed description. The description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein the "operably connected" or "operably attached" means that the two elements are connected or attached either directly or indirectly. Accordingly, the items need not be directly connected or attached but may have other items connected or attached therebetween.

What is claimed is:

1. A levelling machine for use in association with an exterior insulated finish system (EIFS) panel having a plurality of layers including a top layer, comprising:
    a pair of spaced apart rail assemblies, whereby the pair of spaced apart rail assemblies define an x axis;
    a gantry assembly is moveably attached to at least one spaced apart rail assembly of the pair of spaced apart rail assemblies; whereby the gantry assembly defines a y axis and wherein the gantry assembly is moveable in the x axis along the pair of spaced apart rail assemblies; and
    a face mill assembly moveably attached to the gantry assembly and being moveable in the y axis along the gantry assembly, the face mill assembly including:
        a plurality of saw blades, each saw blade of the plurality of saw blades being oriented in a plane that is parallel to the x axis defined by the pair of spaced apart rail assemblies and in a plane that is parallel to the y axis defined by the gantry assembly, each saw blade of the plurality of saw blades having a plurality of teeth that extend downwardly in a z axis, and the face mill assembly being moveable in the z axis, at least two of the plurality of saw blades rotate in opposite directions when in operation, such that when the face mill assembly is operably moved along at least one of the gantry assembly or the pair of spaced apart rail assemblies, the plurality of saw blades rasp the EIFS panel;
        a hood portion of an exhaust system configured to vacuum rasped debris from the EIFS panel, the hood portion including and extending around the plurality of saw blades and including an exit port that is operably attached to a suction device; and
        a back support moveably attached to the gantry assembly and operably connected to the hood portion.

2. The levelling machine of claim 1, wherein the gantry assembly is attached to each spaced apart rail assembly of the pair of spaced apart rail assemblies, wherein the gantry assembly includes a gantry beam and a pair of gantry uprights, wherein each of the gantry uprights is moveably attached at a respective end of the gantry beam, and wherein each of the gantry uprights of the pair of gantry uprights extends downwardly from the gantry beam.

3. The levelling machine of claim 1, further including an edging assembly including a drill bit, the edging assembly being moveably attached to the gantry assembly and being movable in the y axis along the gantry assembly.

4. The levelling machine of claim 3, wherein the drill bit extending extends downwardly in the z axis and is movable upwardly and downwardly.

5. The levelling machine of claim 1, further including a reveal assembly moveably attached to the gantry assembly and being movable in the y axis along the gantry assembly.

6. The levelling machine of claim 5, wherein the reveal assembly includes a heated wire cutter extending downwardly in the z axis and the heated wire cutter being movable upwardly and downwardly.

7. The levelling machine of claim 1, further including an edging and reveal assembly including a reveal assembly and an edging assembly including a drill bit, wherein the edging assembly and the reveal assembly are movable independently of each other in the z axis.

* * * * *